United States Patent
Tomizuka

(10) Patent No.: US 11,297,165 B2
(45) Date of Patent: Apr. 5, 2022

(54) INTERNET OF THINGS DESIGNER FOR AN AUTHORING TOOL IN VIRTUAL AND AUGMENTED REALITY ENVIRONMENTS

(71) Applicant: Taqtile, Inc., Seattle, WA (US)

(72) Inventor: John Tomizuka, Seattle, WA (US)

(73) Assignee: TACTILE, INC., Seattle, WA (US)

( * ) Notice: Subject to any disclaimer, the term of this patent is extended or adjusted under 35 U.S.C. 154(b) by 0 days.

(21) Appl. No.: 16/552,865

(22) Filed: Aug. 27, 2019

(65) Prior Publication Data
US 2020/0068045 A1 Feb. 27, 2020

Related U.S. Application Data

(60) Provisional application No. 62/723,341, filed on Aug. 27, 2018.

(51) Int. Cl.
*H04L 29/06* (2006.01)
*G06T 19/00* (2011.01)
*G06F 9/54* (2006.01)
*H04L 67/131* (2022.01)

(52) U.S. Cl.
CPC ............. *H04L 67/38* (2013.01); *G06F 9/541* (2013.01); *G06T 19/003* (2013.01)

(58) Field of Classification Search
CPC ........ H04L 67/38; G06F 9/541; G06T 19/003
USPC ....................................................... 709/227
See application file for complete search history.

(56) References Cited

U.S. PATENT DOCUMENTS

| 8,275,779 | B2 | 9/2012 | Eggebraaten et al. |
| 2003/0014617 | A1 | 1/2003 | Tamboli et al. |
| 2016/0203090 | A1* | 7/2016 | Caballero ............... G06F 9/546 710/62 |
| 2017/0091160 | A1* | 3/2017 | Lee .......................... G06F 40/14 |
| 2017/0351504 | A1* | 12/2017 | Riedl ....................... G06F 3/002 |

OTHER PUBLICATIONS

International Patent Application No. PCT/US2019/048426, International Search Report and Written Opinion dated Nov. 7, 2019, 16 pages.

* cited by examiner

*Primary Examiner* — Sibte H Bukhari
(74) *Attorney, Agent, or Firm* — Han Santos, PLLC

(57) ABSTRACT

Techniques are described herein for interfacing with various Internet of Things (IoT) devices and for rendering received data in a usable form for an XR collaboration application that provides an interactive experience in an augmented reality (AR), virtual reality (VR), and/or mixed reality (MR) environment. The techniques include retrieving, from an IoT device, IoT data that can represent a physical environment. Additionally, an adapter interface is selected based at least on filter logic associated with a format defined to the selected adapter interface. The IoT data is parsed according to the format defined to the selected adapter interface to permit the XR collaboration application to utilize the IoT data in a usable form. The IoT data that is parsed is associated with virtual content in a virtual environment that represents the physical environment for presentation to the user.

19 Claims, 4 Drawing Sheets

INTERNET OF THINGS DESIGNER FOR AN AUTHORING TOOL IN VIRTUAL AND AUGMENTED REALITY ENVIRONMENTS

RELATED APPLICATION

This application claims priority to a co-pending, commonly owned U.S. Provisional Patent Application No. 62/723,341 filed on Aug. 27, 2018, and titled "Internet of Things ("IOT") Designer for an Authoring Tool in Virtual and Augmented Reality Environments," which is herein incorporated by reference in its entirety.

BACKGROUND

Presently, consumers may experience several different modes of virtual experiences via appropriately enabled user devices. In one example, a user experience may derive solely from computer-generated content executed via a virtual reality (VR) enabled device, which can provide a fully computer-generated visual experience that appears to completely surround the user. In another example, the user experience may derive from virtual content that overlays real-world content via an augmented reality (AR) device. In other words, the user experience may be comprised of a real-world experience that is augmented to include at least some computer-generated content. In yet another example, a user experience may derive from a combination of VR and AR, generated denoted as mixed reality (MR). While the term MR is intended to be more inclusive, it still excludes pure VR experiences. To cover all modes, the term XR (i.e., VR, AR, MR, etc.) may be used.

Applications such as an authoring tool may be used to define virtual content and related actions that allow for creation and modification of workflow applications with multiple virtual environments. The authoring tool may receive and render for presentation, or other uses, content from external dynamic sources, such as sensors and Internet of Things (IoT) devices. There are various types of IoT device configurations, including varying types of hardware, data formats, data types, and methodologies of providing data from IoT devices (e.g. push/pull), etc. In a typical scenario, data is aggregated from multiple IoT devices and big data analytics techniques are applied to discern systemic patterns. However, with the substantial increase in IoT devices, including varying configurations and data collected, it is challenging to interface with each potential IoT device and to render received data in a usable form for the authoring tool.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
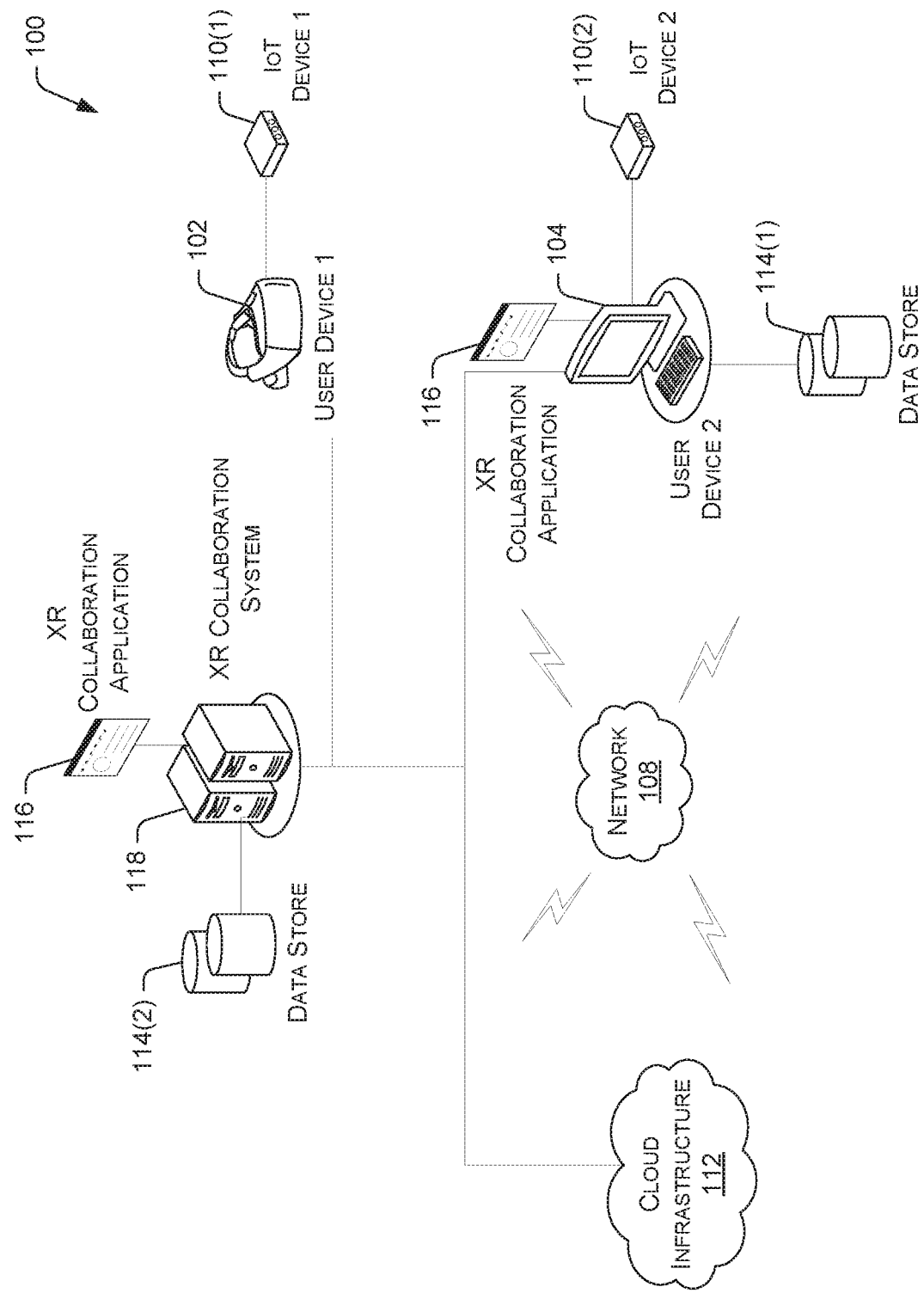
FIG. 1 illustrates an example of network architecture for implementing an IoT designer to utilize content from external dynamic sources in an XR environment.

This disclosure is directed to techniques to interface with various IoT devices and to render received data in a usable form for an application such as an XR collaboration application. The XR collaboration application may be a part of an XR collaboration platform. The platform to enables the application to: write to an arbitrary user interface for any mode of virtual experience (i.e., VR, AR, MR, etc.); perform 3D data visualization and analysis between users; enable 3D information technology workers and developers to maintain 3D models and experiences, maintain XR applications, and to provide support to end users; provide a common set of collaborative experiences, including data transfer, annotation and overlays; and make use of a common set of lower-level XR collaborative facilities, including for object placement, sharing, control management, and data sharing.

For the sake of clarity, a pseudo-acronym XR has been defined to represent a plurality of different modes that application users may experience virtual reality. For example, XR modes may include virtual reality (VR) mode, an augmented reality (AR) mode, and a mixed reality (MR) mode. In some aspects, the XR collaboration application can include an authoring tool for permitting a user to associate one or more markers with physical objects and virtual objects within an XR environment.

A marker may correspond to a graphical representation, such as a pin, that visually overlays a real-world or virtual world object within an XR environment. A pin may be displayed to a user in the XR environment that may show content to the user in relation to a real-world (or virtual world) object. In some aspects, a pin, when activated, may be displayed to a user in an XR environment-enabled user device (e.g., an AR headset) at a specific location on an object (real or virtual) along with various content that may be relevant to that object. For example, in an application designed to train a user on how to maintain a mud pump, a pin may be rendered in a display of an AR headset appearing to be on a real-world mud pump. In some embodiments, the pin may be associated with rules that define pin behaviors. For example, a behavior might be an ordering of multiple pin activations and events that trigger the pin's activation. Continuing with the mud pump example, activating a pin may trigger the application to render content on the AR headset, such as a checklist of scheduled maintenance due.

In some aspects, the marker may be defined within alternate sensory modalities, such as auditory, haptic, olfactory, or any combination thereof. Thus, the marker may be presented visually, audibly, or in a sequence of haptic vibrations, or an odor that is presented based on the fulfillment of appearance criteria. The marker may be associated with physical objects, virtual objects, or environmental data captured within the XR environment. The XR environment can be a representation of a physical environment. Environmental data may include geographic location data, ambient noise data, ambient light data, ambient temperature data, ambient moisture data, ambient odor data, or any other pertinent data.

Following the appearance of a marker within an XR environment, the XR collaboration application may facilitate the user in associating virtual content with one or more markers and further defining activation criteria that control a display of the virtual content within the XR environment. In other words, the virtual content associated with a marker may appear automatically in response to the display of a marker within the XR environment. Alternatively, or additionally, activation criteria may correspond to a gesture performed by the user. The gesture may be captured by an XR environment-enabled user device associated with the user. In some aspects, the XR collaboration application may detect and recognize particular gestures performed by the user that indicates an intention to add, modify, or delete an association between a marker and a physical object within the XR environment.

To enable ease of application development, a user may utilize a template (i.e., an XR template). A template is an application that contains preset markers and content with associated rules. Accordingly, the user may modify an existing application rather than starting from scratch, thereby speeding development and reducing the introduction of errors. Templates may contain one or more markers (e.g., pins) that are configured to store content such as annotations, user-generated data (e.g. comments from users), pre-existing textual and multimedia (e.g., video, still image, sound, etc.) data.

In some aspects, a unique class of content may be associated with dynamic data received from various IoT devices such as sensors. IoT devices are configured to determine, assess, calculate and/or measure data and make the data and related information available to external data consumers, generally over a network. In various embodiments, one or more IoT devices may operate together to provide IoT data. Additionally, the individual IoT devices may comprise one or more sensors, wherein the one or more sensors can provide multiple datasets. To enable the application to obtain data in a usable form from a number IoT device regardless of the IoT device's configurations and any predefined interfaces, the application may be configured to receive and parse data using a predefined adapter interface and format.

In some aspects, the application may implement an IoT designer, which may identify the IoT device's network endpoint (e.g., IP address, port combination, etc.) to select a corresponding adapter interface associated with a specific format defined to the adapter interface. The IoT designer may include an automated adapter matrix and may populate data from the various IoT devices and evaluate which adapter interface and format can be used to parse the data. Various parsing techniques may be implemented. If an adapter interface is not available, the IoT designer may select a default adapter interface comprising a default format. Data received from the IoT device (e.g., in response to a data query from the IoT designer) may be parsed using the selected adapter interface and format via the IoT designer, which is then provided to the authoring tool. The parsed data may be associated with virtual content that is associated with a marker in an XR environment. The techniques described herein may be implemented in a number of ways. Example implementations are provided below with reference to the following figures.

Example Network Architecture

FIG. 1 illustrates example network architecture 100 for implementing an XR collaboration application that includes IoT designer for an authoring tool to provide content in an XR environment. In the illustrated example, the XR collaboration application 116 may be executable via one or more hardware, software, or communication environments, each of which enables the development of content within an XR environment. The XR collaboration application 116 and related techniques as described herein may be used in a number of platform contexts for viewing, editing, creating, and manipulating XR content. In one example, the XR collaboration application may implement an authoring component such as an authoring tool.

The XR application 116 may be implemented on a user device associated with a user developing content for the XR environment. The illustrated embodiment of the architecture 100 includes one or more user devices. The user devices can comprise various VR, AR, and MR user equipment, such as a headset 102. The user devices may also include general-purpose computing devices 104, such as desktop computers, tablet computers, laptop computers, smartphones, mobile devices, personal digital assistants (PDAs) or other electronic devices having a wireless communication function that are capable of receiving input, processing the input, and generating output data to facilitate an augmented reality platform and/or a virtual reality platform.

The user devices 102 and 104 may include an XR application interface that may provide a user with a user interface (UI) capable of utilizing the authoring tool to facilitate the creation and modification of markers and virtual content within the XR environment. In this way, the user devices 102 and 104 are configured to interact with an Application Programming Interface (API) of the remote server, which receives requests and sends responses.

The user devices 102 and 104 may comprise a network interface to participate in a communications environment and interface with one or more IoT devices 110(1) and 110(2). The network interface may be one or more network interfaces including Ethernet, Wi-Fi, or any number of other physical and data link standard interfaces. The IoT devices 110(1) and 110(2) may comprise various types of electronic devices that can communicate and interact with other devices over the Internet, and they can be remotely monitored and controlled. The IoT devices 110(1) and 110(2) may generally include a sensor and may have logic, storage, other hardware or software elements, and a network interface to make sensor data available on one or more network(s) 108. The IoT devices 110(1) and 110(2) can include smart appliances, connected vehicles, home devices (e.g., lighting fixtures, thermostats, home security systems, entertainment systems, cameras, etc.), general-purpose computing devices, and/or other devices that support one or more ecosystems. The IoT devices 110(1) and 110(2) may also include industrial and enterprise IoT devices, depending upon embodiments.

Virtual content in an XR environment may be associated with dynamic data received from various IoT devices. IoT devices are configured to determine, assess, calculate and/or measure data and make the data and related information available to external data consumers (e.g., XR collaboration system 118, user devices 102 and 104, etc.). over the one or more network(s) 108. The network 108 may include public networks such as the Internet, private networks such as institutional and/or personal intranet, or some combination of private and public networks. For example, the network 108 can implement 2G, 3G, 4G, 5G, LTE, LTE advanced, high-speed data packet access (HSDPA), evolved high-speed packet access (HSPA+), UMTS, code-division multiple access (CDMA), GSM, a local area network (LAN), a wide area network (WAN), and/or a collection of networks (e.g., the Internet). The air interface 108 can also comply with a wireless IP protocol (e.g., Wi-Fi, IEEE 802.11).

In the illustrated embodiment, the user devices 102 and 104 may interface with multiple IoT devices 110(1) and 110(2) having multiple configurations. For example, the individual IoT devices 110(1) and 110(2) may comprise one or more sensors, aggregator, data store, logic, and/or any combination thereof. The first IoT device 110(1) and the second IoT device 110(2) may differ in configuration. For instance, the first IoT device 110(1) may include sensors, an aggregator, a data store, and a filter logic. The second IoT device 110(2) may include sensors, an aggregator, and a data store. The second IoT device 110(2) configuration does not include a filter logic. Thus, the two IoT devices 110(1) and 110(2) may uniquely expose sensor data obtained by the respective IoT devices 110(1) and 110(2). For example, the IoT devices 110(1) and 110(2) may utilize different data fields, format, and/or methods for accessing the data. Because the second IoT device 110(2) does not include a filter logic, the second IoT device 110(2) may be unable to retrieve data in a manner requested by external systems (e.g., user devices 102 and 104) seeking to obtain the sensor data.

To enable the user devices 102 and 104 to obtain data in a usable form via the XR collaboration application 116 from a number IoT device regardless of the IoT device's configurations and any predefined interfaces, the XR collaboration application 116 may implement an IoT designer to parse received data from one or more IoT devices 110(1) and 110(2) using a predefined adapter interface and format. The IoT designer may interface with the IoT devices 110(1) and 110(2) to provide the data (e.g., sensor data) being evaluated by a user. In some aspects, the IoT designer may apply an automated adapter matrix to select an adapter interface and format based on an IoT device's network endpoint.

Additionally, or alternatively, the XR collaboration application 116 may also reside at least partially on an XR collaboration system 118 that may operate on one or more distributed computing resources. The XR collaboration system 118 may be accessible by the user devices 102 and 104 via the one or more network(s) 108. In some aspects, the XR collaboration system 118 may be configured to execute the XR collaboration application 116 based on input received from the user devices 102 and 104 that are communicatively coupled via the one or more network(s) 108. In this example, the user devices 102 and 104 may capture input from a user (i.e., an XR author or application user) and further communicate the input to the XR collaboration system 118.

The one or more distributed computing resources of the XR collaboration system 118 may include general-purpose computing devices, such as desktop computers, tablet computers, laptop computers, servers (e.g., on-premise servers), or other electronic devices that are capable of receiving input, processing the input, and generating output data. The computing devices may operate in a cluster or other configuration to share resources, balance load, increase performance, provide fail-over support or redundancy, or for other purposes. Additionally, data processing and data storage may be scaled in response to demand. The computing devices may also be in the form of virtual machines, such as virtual engines (VE) and virtual private servers (VPS). The computing devices may include one or more interfaces to enable communications with other networked devices, such as the user devices 102 and 104 via the one or more networks 108.

In another example, the XR collaboration application 116 may be hosted on the Internet via cloud infrastructure 112. The cloud infrastructure 112 may represent a plurality of disaggregated servers which provide virtual web application server functionality and virtual database functionality. Cloud services may be accessible via the cloud infrastructures 112. The cloud infrastructure 112 may not only provide access to cloud services but also other enterprise services, such as billing services. Further, cloud infrastructure 112 may provide additional service abstractions such as Platform as a Service ("PAAS"), Infrastructure as a Service ("IAAS"), and Software as a Service ("SAAS"). Further, the cloud infrastructure 112 may be used to store third party data used via the XR collaboration application 116.

Alternatively, or additionally, the user devices 102 and 104 may include an instance of the XR collaboration application 116 that may operate independently of the XR collaboration system 118 or cloud infrastructure 112. For instance, the user devices 102 and 104 may determine how to process the data from the IoT devices 110(1) and 110(2) alone, offload the processing to the XR collaboration system 118, or use a combination of its own processing and the system processing in determining how to process the data from the IoT devices 110(1) and 110(2).

In various examples, the XR collaboration system 118 and the user devices 102 and 104 may each have access to a data store 114(1) and 114(2) accessed by a data management system of the XR collaboration system 118 or the user devices 102 and 104. The data store 114(1) and 114(2) may correspond to a third-party data store of IoT device content. The data store 114(1) and 114(2) may be configured as a relational database, an object-oriented database, a NoSQL database, and/or a columnar database, or any configuration to support scalable persistence. The data store 114(1) and 114(2) may store IoT device content, XR templates that correspond to a physical object or predefine an XR environment related to a geographic region (i.e., a physical environment), an automated adapter matrix to help determine the appropriate adapter interface for an IoT device, IoT data, and/or so forth. The data store 114(1) and 114(2) may include data that may be stored in the cloud database and uploaded to the data store 114(1) and 114(2) for use by the user devices 102 and 104. In some aspects, IoT device content, XR templates that correspond to a physical object or that predefine an XR environment related to a geographic region (i.e., a physical environment), an automated adapter matrix, IoT data, or other data in the data store 114(1) and 114(2) that are created or modified by a user device may be stored in the user device remote storage during and then uploaded to the data store 114(1) and 114(2).

IoT Device Configurations

Figure 2:
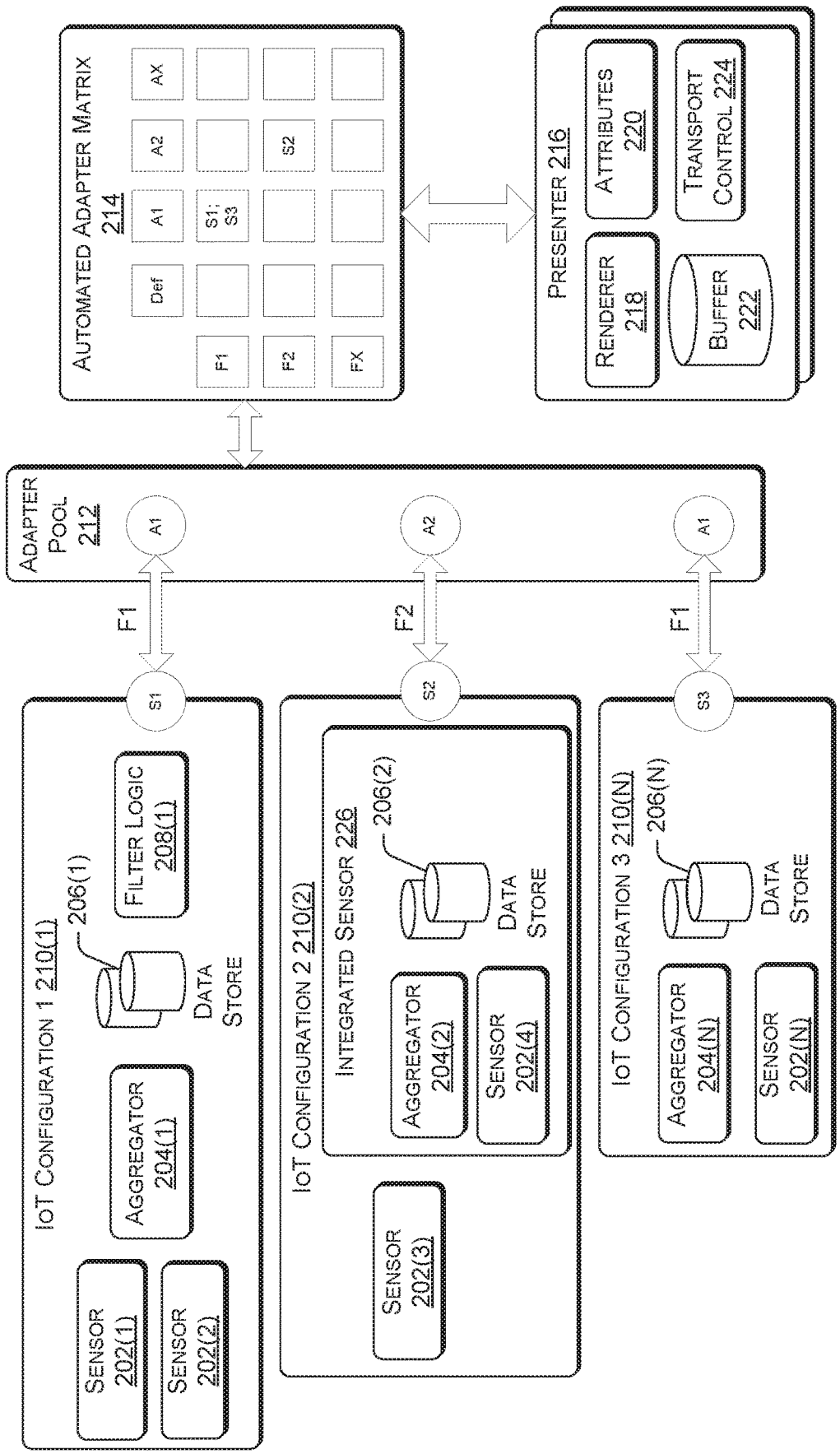
FIG. 2 depicts exemplary IoT device configurations that may be used to provide data to an authoring tool.

FIG. 2 depicts exemplary IoT device configurations for implementing an IoT designer to present content from various IoT devices. In the illustrated embodiment, the first IoT device configuration 210(1) for one or more IoT devices may include the use of one or more sensors 202(1) and 202(2) operatively connected to one or more aggregators 204(1) to collect information from the sensors 202(1) and 202(2). Without limitation, the sensors 202(1) and 202(2) can comprise a temperature sensor, a proximity sensor, an accelerometer, an Infrared (IR) sensor, a pressure sensor, a light sensor, an ultrasonic sensor, a smoke, gas, and alcohol sensor, a Global Positioning System (GPS) sensor, a microphone (to detect ambient noise), an olfactory sensor, a moisture sensor, and/or any type of sensors depending upon embodiments.

The first IoT device configuration 210(1) may also include a data store 206(1) to store data received from the sensors 202(1) and 202(2). In some aspects, the data store 206(1) may apply filter logic 208(1) to perform predetermined actions to facilitate processing (e.g., parsing) the data received from the sensors 202(1) and 202(2). In this way, the IoT device may provide the data to a requesting user device in a usable form. The parsed data may be provided in a predetermined format to a network via a network endpoint (e.g., S1). Each sensor 202(1) and 202(2) in the first IoT device configuration 210(1) may be configured to monitor different events. For example, the first sensor 202(1) (e.g., a thermometer) may be configured to measure temperature and the second sensor 202(2) (e.g., an accelerometer) may be configured to measure speed. In this way, the data or the content associated with the sensors 202(1) and 202(2), as well as the data types, data format, and/or other information may differ.

As is depicted in FIG. 2, the IoT device configurations may vary depending upon embodiments. In this way, some IoT device configurations may not include filter logic. Additionally, IoT device configurations may include an integrated sensor that comprises multiple components, such as additional sensors, aggregator and data store, and/or so forth. For example, the second IoT device configuration 210(2) may include a sensor 202(3) and an integrated sensor 226 comprising an aggregator 204(2), a sensor 202(4), and a data store 206(2). Additionally, the third IoT device configuration 210(N) may include a sensor 202(N), an aggregator 204(N), and a data store 206(N).

One or more IoT devices may be selected to make available IoT data collected via the selected IoT devices. An IoT device may receive a data query from a user device or an XR collaboration system, via an XR collaboration application. In response, the IoT device, based at least on its configuration, may present IoT data using unique data fields, formats, methods, and/or so forth for accessing the data collected via one or more sensors. To address the variability of numerous IoT device configurations, an IoT designer component of the XR collaboration application may implement an automated adapter matrix 214, which can comprise a relational table. The automated adapter matrix 214 comprises an adapter pool 212, which includes one or more adapter interfaces. In some aspects, the automated adapter matrix 214 may identify the network endpoint the IoT device is using to select an appropriate adapter interface comprising a specific format associated with the IoT device's network endpoint. In some aspects, the same network endpoint can be added to one or more IoT devices. The selected adapter interface is applied to the IoT data and parsed. In this regard, the IoT designer may include a parser, which may include one or more instructions compiled or interpreted from computer programs created using a variety of programming languages and/or technologies, including, without limitation, and either alone or in combination, Java, HTML, XML, SQL, modeling languages, scripting languages, interactive data language and object definition language, protocols (e.g., HTTP), and/or so forth.

The automated adapter matrix 214 may be populated dynamically as the XR collaboration application obtains the data from the various IoT devices and evaluates which adapter interface and format can be used to parse the data. Additionally, the adapter pool comprises a default adapter interface (Def) that uses a default format. Accordingly, IoT data from IoT devices that have no entry in the automated adapter matrix 214 may be evaluated and parsed based at least on a default adapter interface.

In the illustrated embodiment, for network endpoints S1 and S3, adapter interface 1 (A1) is used, which comprises format 1 (F1). Accordingly, IoT devices (i.e., IoT configuration 1, IoT configuration 3) that use the S1 or S3 endpoints applies A1, thereby using F1 to parse data from the respective IoT devices. Additionally, for network endpoint S2, adapter interface 2 (A2) is used, which comprises format 2 (F2). Thus, IoT devices (i.e., IoT configuration 2) that use the S2 endpoint applies A2, thereby using F2 to parse data from the respective IoT devices.

To present the information in the XR collaboration application, the IoT designer sends the parsed data to at least one presenter 216 of the XR collaboration application. The presenter 216 can comprise an XR environment-enabled user device such as a headset and other wearable devices including a glove input device. The presenter 216 may include a component to facilitate the acquisition, processing, storing, reporting, and analysis of data from the IoT designer. In some aspects, the presenter 216 may also include a pull module to pull parsed data from the IoT designer or other data sources such as a data store or third party data repositories on a scheduled recurring basis or when relevant parsed data is available.

In the illustrated embodiment, the presenter 216 comprises a renderer 218, attributes 220, buffer 222, and transport control 224. The renderer 218 comprises one or more components for providing, on a display device of a user device (e.g., a headset), virtual content in an XR environment generated from or associated with parsed data. The virtual content may be associated with physical objects, virtual objects, or environmental data captured within the XR environment.

In some aspects, the renderer 218 may provide raw data obtained from the IoT device. For example, the renderer 218 may display sensor data such as temperature readings with timestamps from an IoT device in an XR environment. The sensor data is representative of data obtained from a physical environment that is represented by the XR environment. The renderer 218 may also provide virtual content generated from a selected set of parsed data. For instance, the renderer 218 may provide generated content using data from one or more sensors of a plurality of sensors. In various embodiments, the renderer 218 may generate certain content using parsed data in response to receiving user input (e.g., gestures, voice command, etc.). In addition to visually presenting the virtual content, the renderer 218 may also present content generated from the data visually, audibly, or in a sequence of haptic vibrations or an odor that is presented based on the fulfillment of appearance criteria. The transport control 224 may control the presentation of virtual content associated with parsed data. For example, the presenter 216 may provide a user interface for enabling the transport control 224 to accelerate, decelerate, skip, repeat, pause, and/or stop the presentation of virtual content in response to receiving user input. In some aspects, the presenter 216 may place parsed data in the buffer 222 or a queue before the data is provided to the renderer 218 for presentation to a user via a user device. Additionally, the presenter 216 is configured to control and track the order in which data included in the buffer 222 are received and processed to generate content for rendering.

The parsed data includes a corresponding data attribute 220 that define the parsed data associated with virtual content. Thus, virtual content and their associated attribute 220 may be stored locally or in a data store. A common virtual content may correspond to instances of the same attribute 220 and thereby the same type of physical object or virtual object in an XR environment. For example, the attribute 220 may be stored in a relational table that may be represented by attribute type, attribute value, attribute name, and/or other field or tag. The attribute values for the individual attribute 220 may be populated dynamically from the IoT designer and organized in a hierarchical scheme. For instance, the attribute 220 can include nested attributes to save attributes of parsed data through its associated parent.

Additionally, or alternatively, common virtual content and their associated attribute 220 may be grouped to together to simplify the management of parsed data associated with virtual content within an XR environment.

Example Computing Device Components

Figure 3:
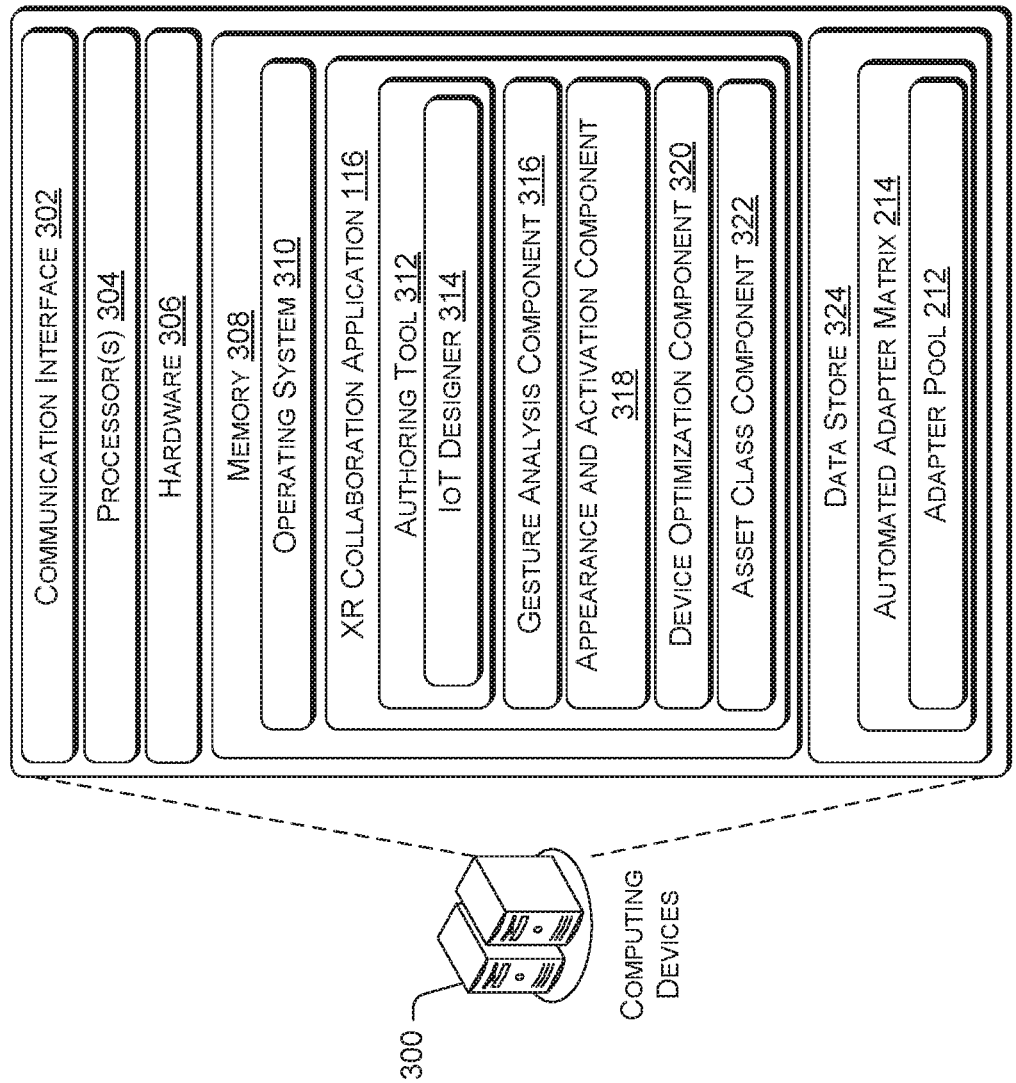
FIG. 3 is a block diagram showing various components of an illustrative computing device that implements an IoT designer for an authoring tool to create, modify, and present virtual content and related actions in multiple virtual environments.

FIG. 3 is a block diagram showing various components of an illustrative computing device 300 for implementing an XR collaboration application. It is noted that the computing device 300 as described herein can operate with more or fewer of the components shown herein. Additionally, the computing device 300 as shown herein or portions thereof can serve as a representation of one or more of the computing devices of the present system.

The computing device 300 may include a communication interface 302, one or more processors 304, hardware 306, and memory 308. The communication interface 302 may include wireless and/or wired communication components that enable the computing device 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the computing device 300.

The memory 308 may store several software components including an operating system 310, an XR collaboration application 116, and a data store 324. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The operating system 310 may include components that enable the computing device 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The XR collaboration application 116 is configured to enable users to create, edit, modify, view, and retrieve XR content. The XR collaboration application 116 comprises an authoring tool 312, gesture analysis component 316, appearance and activation component 318, device optimization component 320, asset class component 322. The authoring tool 312 enables a user to create and place one or more graphical markers, such as a pin, in an XR environment. The markers may be associated with a real-world item and textual and/or multimedia content. The authoring tool 312 may also be used to change the markers' behavior.

Additionally, one or more rules may be applied to enable the markers and/or its associated content to appear in an XR environment. In one example, markers comprising pins may always be visible in an XR environment and the content may be presented to a user appear in response to a gesture made by the user to activate the pin associated with the content. In another example, one or more pins may appear in an XR environment in a predetermined order in response to making a determination that one or more prerequisite pins had been activated and the content has been presented or viewed.

The authoring tool 312 may be configured to add, change, or remove markers, content, and behavior (i.e., in a template) as desired by performing manipulations within an XR environment. In some aspects, a user may make a gesture to perform manipulations within an XR environment. The manipulations may be made from scratch or an existing template. The authoring tool 312 may then record the changes as a template, which may be stored locally at a user device's storage or in a data store. A template that is associated with a marker on a server (e.g., of the XR collaboration system) may be modified with the locally stored changes.

The authoring tool 312 comprises an IoT designer 314 that is configured to parse data from one or more IoT devices for use in the XR collaboration application 116. The IoT designer 314 of the authoring tool 312 may be implemented by the system processes defined herein to determine and select an appropriate adapter interface to parse data retrieved from various IoT devices. The IoT designer 314 may facilitate interfacing with one or more IoT devices. To enable the computing device 300 to request and obtain the requested data from an IoT device in a usable form for use by the XR collaboration application 116, the IoT designer 314 identifies the network endpoint of the IoT device. Upon identifying the network endpoint, the IoT designer 314 selects an adapter interface and associated format defined to the adapter interface from an automated adapter matrix 214 that may be stored in the data store 324. The filter logic associated with the format defined to the adapter interface is used parse the data or information from the IoT device.

In various embodiments, the automated adapter matrix 214 may include a field for an adapter interface (e.g., adapter pool 212), a predefined format, and/or so forth. The IoT designer 314 may determine whether the network endpoint of the IoT device is populated in the automated adapter matrix 214. If the network endpoint of the IoT device is not populated in the adapter matrix, the IoT designer 314 may select a default adapter interface to convert data into a default format. If a default adapter interface is not available or the data cannot be converted into a usable form, the IoT designer 314 may select other adapter interfaces associated with a different format in a predetermined sequence until the data can be parsed into a usable form. The IoT designer 314 may populate data from the various IoT devices continuously and evaluate which adapter interface and format can be used to parse data for use by the XR collaboration application 116. For example, the IoT designer 314 may update the automated adapter matrix 214 once an adapter interface associated with usable format is identified for a network endpoint associated with one or more IoT devices. The IoT designer 314 may also implement machine learning algorithms to identify which adapter interface and format can be used to parse data, depending upon embodiments.

The gesture analysis component 316 may capture and quantify a gesture performed by a user via an XR environment-enabled user device. In some examples, the gesture analysis component 316 may compare a captured gesture against stored gestures within an XR template to determine whether the gesture in an indicator for revealing virtual content, forgoing a presentation of virtual content, or dismissing a marker. Moreover, the gesture analysis component 316 may also monitor the user's interaction within an XR environment. In some aspects, the gesture analysis component 316 may implement machine learning algorithms to analyze the user's actions and determine whether those actions are consistent with instructions annotated or recorded within corresponding virtual content.

The appearance and activation component 318 may generate appearance criteria that are associated with markers and activation criteria that are associated with the virtual content of an XR template. Appearance criteria may be configured to control when markers display within an XR environment. Appearance criteria may cause a marker to become visible or remain visible based on the fulfillment of a predetermined condition. The predetermined condition may be set by the user and may be based on threshold environmental data, such as a threshold temperature, a threshold noise level, a threshold light intensity, a threshold moisture level, a threshold odor intensity, or any other pertinent data. alternatively, or additionally, the predetermined condition may be based on the user being within a predetermined proximity of a physical object within the XR environment.

Activation criteria may be configured to control when the virtual content associated with a marker is displayed within the XR environment. In some examples, the activation criteria may comprise of a gesture performed by an application user that is interacting with an XR template within the XR environment. Activation criteria may be configured to reveal virtual content, forgo a presentation of virtual content, or dismiss a presentation of a marker. While activation criteria may correspond to a gesture performed by the user, other types of activation criteria are possible. For example, activation criteria may be based on one or more of an audible command, time, temperature data, light intensity data, moisture data, noise data, weather data, odor data, or any other form of pertinent data deemed relevant by the user.

The device optimization component 320 is configured to optimize the resolution of assets such as markers and other virtual content depending on the viewing technology of the XR environment-enabled user device. In other words, the device optimization component 320 may determine the resolution capability of an XR environment-enabled user device and further optimize a presentation of an XR template based on the determined capability.

The asset class component 322 may dynamically generate asset classes of virtual content, appearance criteria, and activation criteria that relate to a common marker (i.e., a physical object) within an XR template. A common marker may correspond to instances of the same type of physical object or virtual object. An asset class may include virtual content, appearance criteria (i.e., markers) and activation criteria (i.e., virtual content). By grouping virtual content and corresponding criteria that relate to the same type of physical or virtual object, the asset class component 322 can simplify the proliferation of virtual content with the XR environment.

Further, the asset class component 322 may generate a sub-asset class to account for variations in a type of physical object or virtual object within an XR environment. Thus, Physical Object B that differs slightly from Physical Object A may be presented by an asset class of Physical Object A and a sub-asset class that accounts for the differences between Physical Objects A and B.

The data store 324 can comprise a data management layer that includes software utilities for facilitating the acquisition, processing, storing, reporting, and analysis of data from multiple data sources such as IoT devices and third-party data repositories. In one example, the data store 324 may store XR templates, XR or virtual content (e.g., markers), IoT data (e.g., sensor data), and/or an automated adapter matrix 214. In various embodiments, the data store 324 can interface with an API for providing data access.

Example Processes

Figure 4:
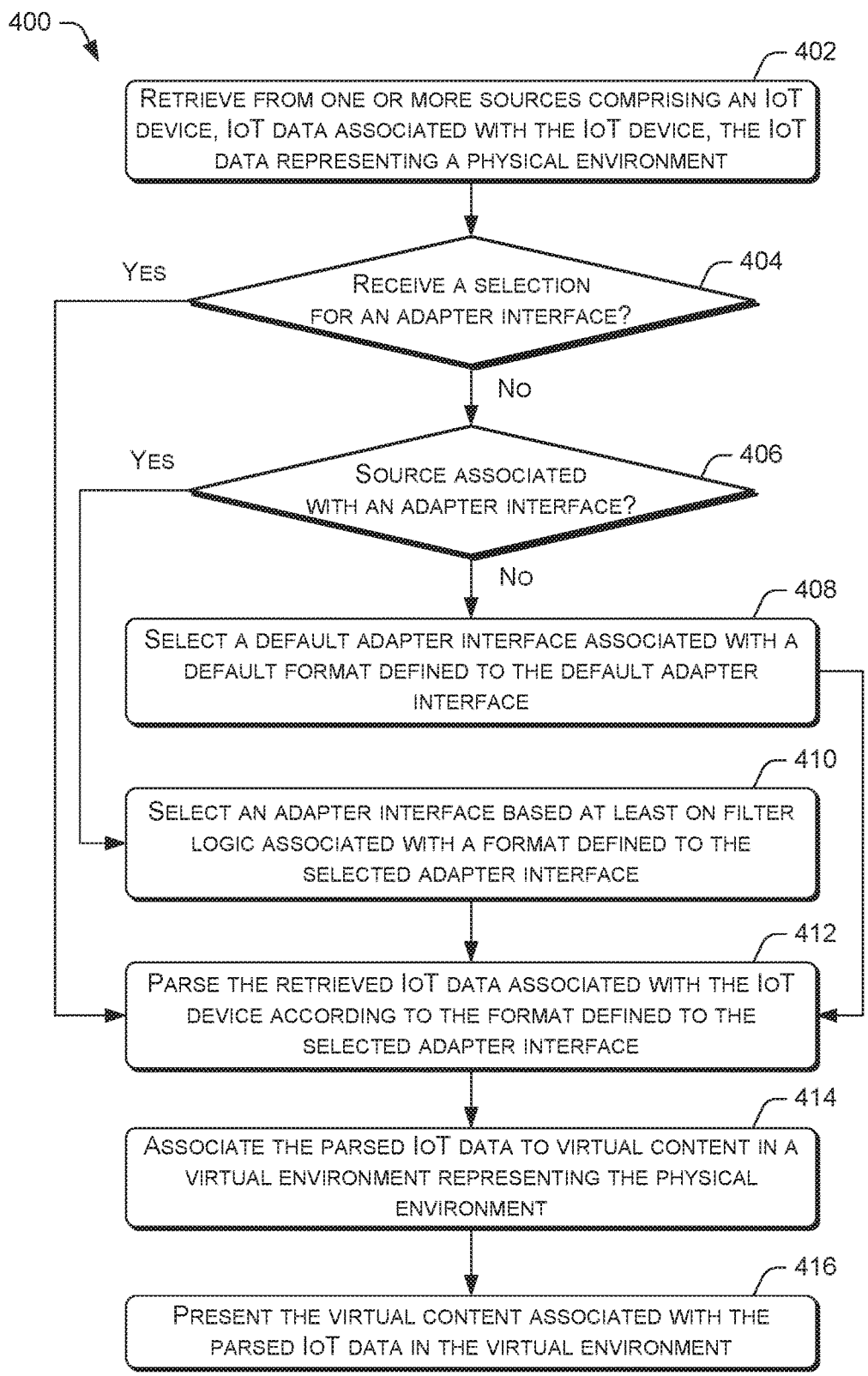
FIG. 4 is a flow diagram of an example process for selecting an adapter interface associated with a format for IoT data from various IoT devices to use in an authoring tool.

FIG. 4 presents an illustrative process 400 for implementing an IoT designer for an authoring tool in an XR environment. The process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 is described with reference to FIGS. 1-3.

FIG. 4 is a flow diagram of an example process 400 for implementing an IoT designer for an authoring tool in an XR environment from a perspective of a computing device that hosts an XR collaboration application. The computing device may be configured to enumerate available sources (i.e., IoT devices) for data. In the context of an authoring tool of the XR collaboration application, one or more IoT devices that are available in a specific context may be displayed to a user. For example, a user developing a checklist or standard procedure for operating a mud pump may view all or selected sources of IoT data associated with that mud pump in an XR environment, wherein the data can be displayed or used for generating virtual content in the XR environment.

At block 402, the computing device, via the XR collaboration application, retrieves from an IoT device, IoT data associated with the IoT device, the IoT data representing a physical environment. The physical environment may be where an application user is located. Additionally, or alternatively, the physical environment may be a remote location. At decision block 404, the computing device, via an IoT designer of the XR collaboration application, determines whether an adapter interface is selected for the IoT device. If the adapter interface is not selected (i.e., by user input) ("no" from block 404), the IoT designer determines whether an adapter interface is associated with the IoT device, as indicated in decision block 406. In various embodiments, the IoT designer may implement an automated adapter matrix to determine whether the network endpoint of the IoT device is associated with a pre-populated adapter interface having a predefined format.

If the IoT device is not associated with a pre-populated adapter interface having a predefined format ("no" from block 406), the IoT designer selects a default adapter interface associated with a default format defined to the default adapter interface, as indicated in block 408. If the IoT device is associated with a pre-populated adapter interface ("yes" from block 406), the IoT designer selects an adapter interface based at least on filter logic associated with a format defined to the selected adapter interface, as indicated in block 410. The adapter interface may be pre-populated in an automated adapter matrix.

At block 412, the IoT designer parses the retrieved IoT data associated with the IoT device according to the format defined to the selected adapter interface. Additionally, or alternatively, if the adapter interface is manually selected ("yes" from block 404), the IoT designer parses the retrieved data associated with the IoT device according to the format defined to the manually selected adapter interface. The IoT designer may store the user input comprising instructions to select the manually selected adapter interface in the automated adapter matrix and update the automated adapter matrix based at least on the user input to make the same selection for similar IoT devices or other data sources interfacing in the future.

At block 414, the parsed data is associated with virtual content in a virtual environment that represents the physical environment. The virtual content can be a marker or other graphical representations. Additionally, the virtual content may be in a virtual reality environment, an augmented reality environment, a mixed reality environment, and/or any combination thereof (i.e., XR environment). At block 416, the virtual content that is associated with the parsed IoT data is presented in the virtual environment. In some aspects, at least one user device (e.g., XR environment-enabled user device) may be selected to provide the virtual content to a user.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    retrieving, from an Internet of Things (IoT) device, IoT data associated with the IoT device, the IoT data representing a physical environment;
    selecting, from an automated adapter matrix, an adapter interface based at least on filter logic associated with a format defined to the selected adapter interface, wherein the filter logic is based at least on a network endpoint stored in the automated adapter matrix, the network endpoint associated with an additional IoT device;
    parsing the retrieved IoT data associated with the IoT device according to the format defined to the selected adapter interface;
    associating the parsed IoT data to virtual content in a virtual environment that represents the physical environment;
    presenting the virtual content associated with the parsed IoT data in the virtual environment;
    retrieving, from the additional IoT device, additional IoT data associated with the additional IoT device, the additional IoT data representing the physical environment, wherein the IoT device and the additional IoT device comprise different device configurations;
    selecting the adapter interface associated with the format defined to the selected adapter interface;
    parsing the additional IoT data associated with the additional IoT device according to the format defined to the selected adapter interface;
    associating the additional IoT data to additional virtual content in the virtual environment; and
    presenting the additional virtual content associated with the additional IoT data in the virtual environment.

2. The one or more non-transitory computer-readable media of claim 1, wherein the filter logic is based at least on a network endpoint stored in the automated adapter matrix, the network endpoint associated with the IoT device.

3. The one or more non-transitory computer-readable media of claim 1, the acts further comprising:
    selecting a default adapter interface associated with a default format defined to the default adapter interface; and
    parsing the retrieved IoT data associated with the IoT device according to the default format defined to the default adapter interface.

4. The one or more non-transitory computer-readable media of claim 1, the acts further comprising:
    receiving a user input comprising instructions to select an additional adapter interface associated with an additional format defined to the additional adapter interface; and
    parsing the retrieved IoT data associated with the IoT device according to the additional format defined to the additional adapter interface.

5. The one or more non-transitory computer-readable media of claim 4, the acts further comprising:
    storing the user input comprising instructions to select the additional adapter interface in the automated adapter matrix; and
    updating the automated adapter matrix based at least on the user input.

6. A computer-implemented method, comprising:
retrieving, from an Internet of Things (IoT) device, IoT data associated with the IoT device, the IoT data representing a physical environment;
receiving a user input comprising instructions to select an adapter interface associated with a format defined to the selected adapter interface;
parsing the retrieved IoT data associated with the IoT device according to the format defined to the selected adapter interface;
associating the parsed IoT data to virtual content in a virtual environment that represents the physical environment;
presenting the virtual content associated with the parsed IoT data in the virtual environment;
retrieving, from an additional IoT device, additional IoT data associated with the additional IoT device, the additional IoT data representing the physical environment, wherein the IoT device and the additional IoT device comprise different device configurations;
selecting, from an automated adapter matrix, the adapter interface based at least on filter logic associated with the format defined to the selected adapter interface, wherein the filter logic is based at least on a network endpoint stored in the automated adapter matrix, the network endpoint associated with the additional IoT device;
parsing the additional IoT data associated with the additional IoT device according to the format defined to the selected adapter interface;
associating the additional IoT data to additional virtual content in the virtual environment; and
presenting the additional virtual content associated with the additional IoT data in the virtual environment.

7. The computer-implemented method of claim 6, further comprising:
storing the user input comprising instructions to select the adapter interface in the automated adapter matrix; and
updating the automated adapter matrix based at least on the user input.

8. The computer-implemented method of claim 6, wherein the network endpoint is associated with one or more IoT devices.

9. The computer-implemented method of claim 6, further comprising:
selecting a default adapter interface associated with a default format defined to the default adapter interface; and
parsing the retrieved IoT data associated with the IoT device according to the default format defined to the default adapter interface.

10. The computer-implemented method of claim 6, further comprising: selecting at least one user device on which the virtual content is presented.

11. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
retrieve, from an Internet of Things (IoT) device, IoT data associated with the IoT device, the IoT data representing a physical environment;
select, from an automated adapter matrix, an adapter interface based at least on filter logic associated with a format defined to the selected adapter interface, wherein the filter logic is based at least in a network endpoint stored in the automated adapter matrix, the network endpoint associated with the IoT device;
parse the retrieved IoT data associated with the IoT device according to the format defined to the selected adapter interface;
associate the parsed IoT data to virtual content in a virtual environment that represents the physical environment;
present the virtual content associated with the parsed IoT data in the virtual environment;
retrieve, from an additional IoT device, additional IoT data associated with the additional IoT device, the additional IoT data representing the physical environment, wherein the IoT device and the additional IoT device comprise different device configurations, wherein the additional IoT device is associated with the network endpoint;
select the adapter interface associated with the format defined to the selected adapter interface;
parse the additional IoT data associated with the additional IoT device according to the format defined to the selected adapter interface;
associate the additional IoT data to additional virtual content in the virtual environment; and
present the additional virtual content associated with the additional IoT data in the virtual environment.

12. The system of claim 11, wherein the one or more processors are further configured to:
select a default adapter interface associated with a default format defined to the default adapter interface; and
parse the retrieved IoT data associated with the IoT device according to the default format defined to the default adapter interface.

13. The system of claim 11, wherein the one or more processors are further configured to:
receive a user input comprising instructions to select an additional adapter interface associated with an additional format defined to the additional adapter interface; and
parse the retrieved IoT data associated with the IoT device according to the additional format defined to the additional adapter interface.

14. The one or more non-transitory computer-readable media of claim 1, wherein the network endpoint is associated with one or more IoT devices.

15. The one or more non-transitory computer-readable media of claim 1, the acts further comprising:
selecting at least one user device on which the virtual content is presented.

16. The computer-implemented method of claim 6, wherein the filter logic is based at least on the network endpoint stored in the automated adapter matrix, the network endpoint associated with the IoT device.

17. The one or more non-transitory computer-readable media of claim 1, the acts further comprising:
selecting at least one user device on which the virtual content is presented.

18. The computer-implemented method of claim 6, further comprising:
receiving a user input comprising instructions to select an additional adapter interface associated with an additional format defined to the additional adapter interface; and parsing the retrieved IoT data associated with the IoT device according to the additional format defined to the additional adapter interface.

19. The system of claim 13, wherein the one or more processors are further configured to:

store the user input comprising instructions to select the additional adapter interface in the automated adapter matrix; and
update the automated adapter matrix based at least on the user input.

* * * * *